(12) United States Patent
Chen et al.

(10) Patent No.: US 9,483,468 B2
(45) Date of Patent: *Nov. 1, 2016

(54) TAGGING GEOGRAPHICAL AREAS (71) Applicant: International Business Machines Corporation, Armonk, NY (US)

(72) Inventors: Yue H. Chen, Beijing (CN); Wei Shan Dong, Beijing (CN); Chun Yang Ma, Beijing (CN); Chunhua Tian, Beijing (CN); Yu Wang, Hangzhou (CN); Chao Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,936

(22) Filed: Jun. 22, 2015

(65) Prior Publication Data
US 2015/0319576 A1 Nov. 5, 2015

Related U.S. Application Data (63) Continuation of application No. 14/679,165, filed on Apr. 6, 2015.

(30) Foreign Application Priority Data

Apr. 30, 2014 (CN) .......................... 2014 1 0183498

(51) Int. Cl.
*H04W 4/02* (2009.01)
*H04W 4/18* (2009.01)
*G06F 17/30* (2006.01)

(52) U.S. Cl.
CPC ......... *G06F 17/30* (2013.01); *G06F 17/30241* (2013.01); *H04W 4/023* (2013.01); *H04W 4/028* (2013.01); *H04W 4/185* (2013.01); *H04W 4/021* (2013.01)

(58) Field of Classification Search
CPC ..... H04W 4/02; H04W 4/021; H04W 4/025; H04W 4/028; H04W 4/04
See application file for complete search history.

(56) References Cited

U.S. PATENT DOCUMENTS

| | | | | |
|---|---|---|---|---|
| 2012/0047184 A1* | 2/2012 | Purdy | ................ | G06Q 30/0204 707/803 |
| 2013/0290332 A1* | 10/2013 | Carlsson | ........... | G06F 17/30595 707/736 |
| 2015/0058345 A1* | 2/2015 | Mishra | ................... | G06Q 50/01 707/737 |

OTHER PUBLICATIONS

List of IBM Patents or Patent Applications Treated as Related; CN920140024US2, Date Filed: Jun. 22, 2015, pp. 1-2.
Yue H. Chen, et al., "Tagging Geographical Areas," U.S. Appl. No. 14/679,165, filed Apr. 6, 2015.

* cited by examiner

*Primary Examiner* — Anthony Addy
*Assistant Examiner* — Martin Chang
(74) *Attorney, Agent, or Firm* — Cantor Colburn LLP; Keivan Razavi (57) ABSTRACT

A method of tagging a geographical area includes obtaining, with a processing device, attribute information and mobile tracking data of a plurality of mobile objects, wherein the mobile tracking data comprises sampling time and corresponding sampling point locations of the mobile objects; converting the mobile tracking data of the plurality of mobile objects into new mobile tracking data according to the correspondence relationship between the sampling time and a time slices, wherein the new mobile tracking data include time slices and corresponding sampling point locations; and obtaining a set of attribute information of at least one geographical area with respect to the time slices based on the new mobile tracking data, wherein the at least one geographical area is obtained by clustering the sampling point locations.

8 Claims, 5 Drawing Sheets

TAGGING GEOGRAPHICAL AREAS

DOMESTIC AND FOREIGN PRIORITY

This application is a continuation of U.S. patent application Ser. No. 14/679,165, filed Apr. 6, 2015, which claims priority to Chinese Patent Application No. 201410183498.X, filed Apr. 30, 2014, and all the benefits accruing therefrom under 35 U.S.C. §119, the contents of which in its entirety are herein incorporated by reference.

BACKGROUND

The present invention relates to an electronic map, and more specifically, to a method and apparatus for tagging geographical areas.

An electronic map, which is also referred to as a digital map, is a map that is stored and available for lookup in digital manner using computer technologies. The electronic map has become an extension of a traditional map due to its real-time nature, large information volume, and rich functionality, and as a result has become a feature of irreplaceable utility and functionality. A strong competitive edge for many electronic map operators results from how to tag geographical areas of an electronic map. Successful tagging may yield substantial profits to clients with the least money, reduce service costs, and enhance customer satisfaction.

Existing methods of tagging a geographical area typically include tagging a static geographical mark on a geographical area, where the geographical mark may be obtained from geographical location information database or extracted from users' comments with pictures carrying geographical location information shared on the network. However, this kind of attribute information generally reflects geographical features of the geographical area, but cannot reflect attribute information of the geographical area relating to time. Besides the geographical mark, it is also desirable to obtain other attribute information of the geographical area related with time.

SUMMARY

According to one embodiment of the present invention, there is provided a method of tagging a geographical area, comprising: obtaining attribute information and mobile tracking data of a plurality of mobile objects, wherein the mobile tracking data comprises sampling time and corresponding sampling point locations of the mobile objects; converting the mobile tracking data of the plurality of mobile objects into new mobile tracking data according to the correspondence relationship between the sampling time and time slices, wherein the new mobile tracking data include time slices and corresponding sampling point locations; obtaining a set of attribute information of at least one geographical area with respect to the time slices based on the new mobile tracking data, wherein the at least one geographical area is obtained by clustering the sampling point locations.

According to another embodiment of the present invention, there is provided an apparatus for tagging a geographical area, comprising: a tracking data obtaining module configured to obtain attribute information and mobile tracking data of a plurality of mobile objects, wherein the mobile tracking data comprises sampling time and corresponding sampling point locations of the mobile objects; a tracking data converting module configured to convert the mobile tracking data of the plurality of mobile objects into new mobile tracking data according to the correspondence relationship between the sampling time and time slices, wherein the new mobile tracking data include time slices and corresponding sampling point locations; and attribute information first obtaining module configured to obtain a set of attribute information of at least one geographical area with respect to the time slices based on the new mobile tracking data, wherein the at least one geographical area is obtained by clustering the sampling point locations.

The method and apparatus for tagging a geographical area according to the embodiments of the present invention can obtain attribute information of the geographical area related to time, and the obtained attribute information of the geographical area may accurately tag constantly changing features of the geographical area with change of time slices.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
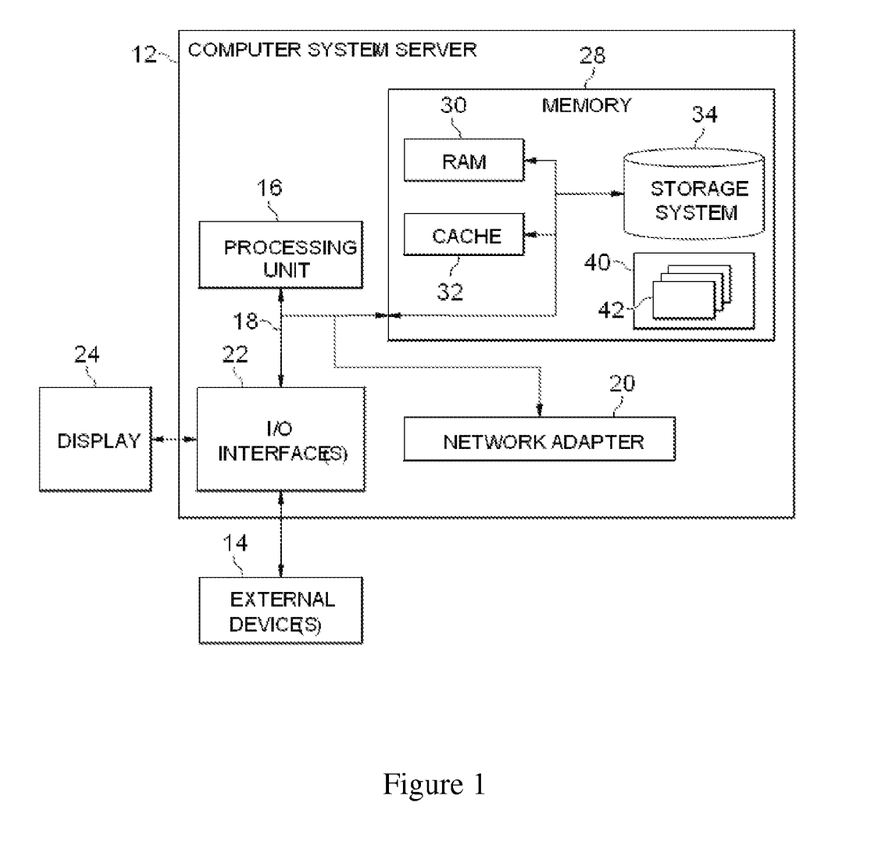
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
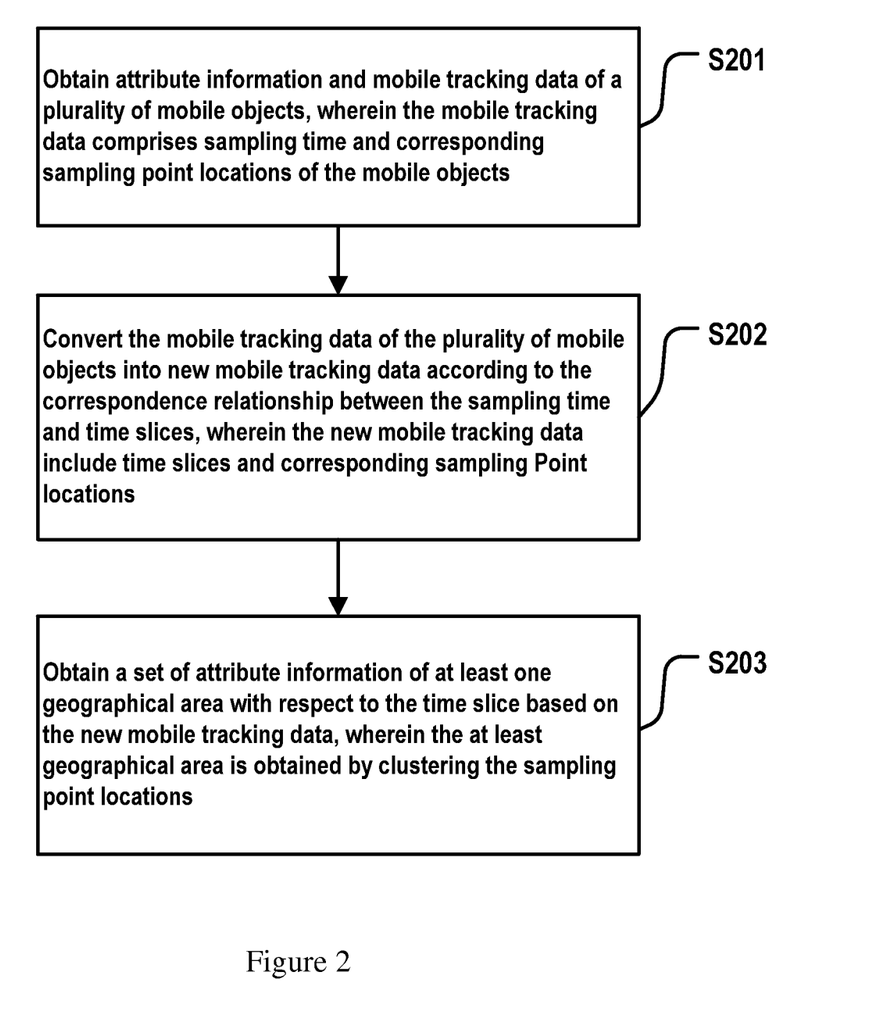
FIG. 2 shows a method of tagging a geographical area according to an embodiment of the present invention.

With reference now to FIG. 2, a method for tagging a geographical area according to an embodiment of the present invention is provided, including: in operation S201, obtaining attribute information and mobile tracking data of a plurality of mobile objects, wherein the mobile tracking data comprises sampling time and corresponding sampling point locations of the mobile objects; in operation S202, converting the mobile tracking data of the plurality of mobile objects into new mobile tracking data according to the correspondence relationship between the sampling time and time slices, wherein the new mobile tracking data include time slices and corresponding sampling point locations; in operation S203, obtaining a set of attribute information of at least one geographical area with respect to the time slices based on the new mobile tracking data, wherein the at least one geographical area is obtained by clustering the sampling point locations.

In operation S201, attribute information and mobile tracking data of a plurality of mobile objects are obtained. The mobile tracking data refer to the data obtained by sampling the movement process of a plurality of mobile objects, including: sampling point locations, sampling time, velocity, etc. The sampling point data in sequence form mobile tracking data. With a smart phone having a positioning function as an example, the mobile tracking data reflect moving conditions of the phone holder within a period of time. The mobile Internet network may locate the location of the phone through radio signals and then sample and record, thereby forming the mobile tracking data of the phone holder through connecting the sampling points; a GPS positioning terminal records with a fixed sampling frequency the longitude and latitude information of the location where the terminal is located, and data is collected on a server through a wireless network; with a RFID tag technology, an object can be tagged and positioned and then location data can be recorded with respect to a mobile route of the RFID identifier to form a mobile track of a mobile object. The attribute information of a mobile object may include registration information of the mobile object, for example, occupation, age, hobbits, etc. For example, the attribute information of a mobile user 1 includes {programmer, playing soccer}; the mobile tracking data of mobile user 1 include {(05:18:00 Monday, loc1(x1, y1)), (10:23:00 Monday, loc1(x1, y1)), (05:56:34 Tuesday, loc3(x3, y3)), (10:01:34 Tuesday, loc1(x1, y1))}. The attribute information of the mobile user 2 includes {programmer, singing}; the mobile tracking data of the mobile user 2 includes: {(10:08:56 Tuesday, loc1(x1, y1)), (10:34:12 Tuesday, loc2(x2, y2)), (11:03:23 Tuesday, loc2(x2, y2))}.

In operation S202, the mobile tracking data of the plurality of mobile objects are converted into new mobile tracking data according to correspondence relationship between sampling time and time slices, wherein the new mobile tracking data include time slices and corresponding sampling point locations. The operation S202 specifically includes: obtaining divided time slices; determining correspondence relationship between sampling time and time slices in the mobile tracking data; replacing the sampling time in the mobile tracking data with corresponding time slices, thereby obtaining the new tracking data. For example, one day is sliced into 4 time ranges: early morning (0:00-06:00), morning (06:00-12:00), afternoon (12:00-18:00), and night (18:00-24:00), and meanwhile, dates are divided two types: work days and off days, resulting in 8 different types of time slices: T1 (work day 0:00-06:00), T2 (work day 06:00-12:00), T3 (work day 12:00-18:00), T4 (work day 18:00-24:00), T5 (off day 0:00-06:00), T6 (off day 06:00-12:00), T7 (off day 12:00-18:00), T8 (off day 18:00-24:00). Still with the above mobile user 1 and mobile user 2 as examples, the sampling time in the mobile tracking data of user 1 and user 2 correspond to 8 time slices, resulting in new mobile tracking data of mobile user 1: {(T1, loc1(x1, y1)), (T2, loc1(x1, y1)), (T1, loc3(x3, y3)), (T2, loc1(x1, y1))}; and the mobile tracking data of the mobile user 2: {(T2, loc1(x1, y1)), (T2, loc2(x2, y2)), (T2, loc2(x2, y2))}.

Figure 3:
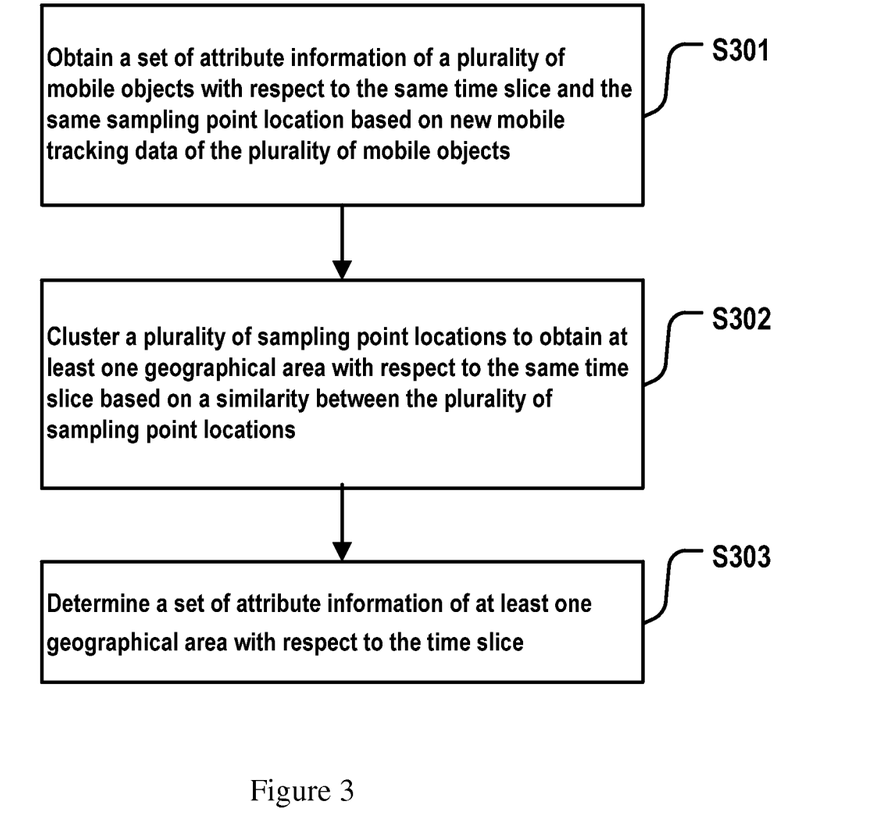
FIG. 3 shows a method of obtaining a set of attribute information of at least one geographical area with respect to time slices based on new mobile tracking data according to an embodiment of the present invention.

In operation S203, a set of attribute information of at least one geographical area with respect to the time slices is obtained based on the new mobile tracking data, wherein the at least one geographical area is obtained by clustering the sampling point locations. Specifically, FIG. 3 shows a method of obtaining a set of attribute information of at least one geographical area with respect to time slices based on the new mobile tracking data according to the embodiments of the present invention, including: operation S301, obtaining a set of attribute information of a plurality of mobile objects having the same time slice and the same sampling point location based on new mobile tracking data of the plurality of mobile objects; operation S302, clustering a plurality of sampling point locations to obtain at least one geographical area with respect to the same time slice based on a similarity between the plurality of sampling point locations; operation S303, determining a set of attribute information of at least one geographical area with respect to the time slice.

The attribute information of the geographical area as obtained according to the embodiments of the present invention may accurately tag constantly changing features of the geographical area with the change of time slices, e.g., occupations and hobbits of people doing activities within different time, and such attribute information may reflect the cultural characteristics of the geographical area.

In operation S301, the obtaining a set of attribute information of a plurality of mobile objects with respect to the same time slice and the same sampling point location based on the new mobile tracking data of a plurality of mobile objects comprises operations S401-S403.

Figure 4:
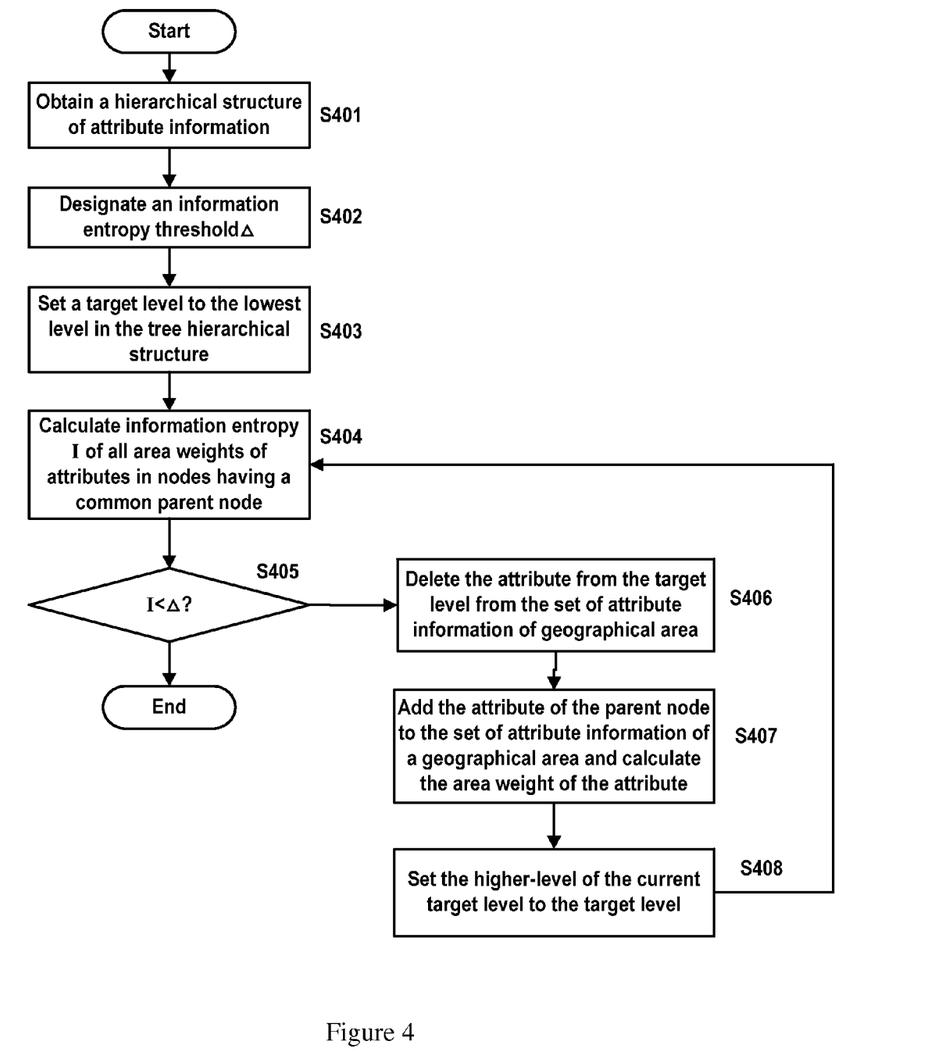
FIG. 4 shows a flowchart of replacing attribute information in a set of attribute information with higher-level attribute information according to an embodiment of the present invention.

In operation S401, the times of occurrence of each mobile object at the time slices and sampling point locations recorded in the new mobile tracking data is summarized. Still taking the above mobile users 1 and 2 as an example, the mobile user 1 occurs once at (T1, loc1(x1, y1)), twice at (T2, loc1(x1, y1)), and once at (T1, loc3(x3, y3)). The mobile user 2 occurs once at (T1, loc1(x1, y1)) and twice at (T2, loc2(x2, y2)).

In operation S402, for each mobile object, a correspondence relationship among the time slices and sampling point location information recorded in the new mobile tracking data record, attribute information, and occurrence times, namely, (time slice, location)->(attribute 1, occurrence times) (attribute 2, occurrence times) . . . With mobile user 1 and mobile user 2 as an example, the correspondence relationship of mobile user 1 is:

(T1, loc1(x1, y1))-->{(programmer, 1), (playing soccer, 1)};
(T2, loc1(x1, y1))-->{(programmer, 2), (playing soccer, 2)};
(T1, loc3(x3, y3))-->{(programmer, 1), (playing soccer, 1)}.

The correspondence relationship of mobile user 2 is:
(T2, loc2(x2, y2))-->{(programmer, 2), (singing, 2)};
(T2, loc1(x1, y1))-->{(programmer, 1), (sing, 1)}

In operation 403, a set of attribute information of multiple mobile objects with respect to the same time slice and the same sampling point location and a confidence of the attribute information are obtained based on the new mobile tracking data.

According to the embodiments of the present invention, the set of attribute information of multiple mobile objects with respect to the same time slice and the same sampling point location and the confidence of the attribute information may be obtained using an association rule. The association rule is an important task in data mining, which digs out valuable association relationship between data items from a great amount of data. The association rule is defined as suppose $I=\{I_1, I_2, \ldots I_m\}$ is a set of items. Given a transaction database $D=\{t_1, t_2, \ldots, t_n\}$, wherein each transaction t is a non-empty subset of I, i.e., $t \subseteq I$, each transaction corresponds to a unique identifier (Transaction ID). The association rule is an implication like $X \Rightarrow Y$, wherein $X, Y \subseteq I$ and $X \cap Y = \emptyset$, wherein X and Y are called antecedent and consequent of the association rule, respectively. The support of the association rule $X \Rightarrow Y$ in D is the percentage of $X \cup Y$ in the transaction, i.e., probability $P(X \cup Y)$, and confidence is the percentage of Y in the transaction including X, i.e., conditional probability $P(Y|X)$.

According to the embodiments of the present invention, the antecedent of the association rule includes the time slice and sampling point location, and consequence includes the set of attribute information and the confidence of the attribute information. Here, the meaning of confidence is the probability of occurrence of an attribute under a precondition of a certain time slice and a sampling point location. The set of attribute information is obtained by merging the attribute information of the plurality of mobile objects with respect to the same time slice and the same sampling point location.

With (T1, loc1(x1, y1)), there is only a correspondence relation (T1, loc1(x1, y1))-->{(programmer, 1), (playing soccer, 1)} of mobile user 1 corresponding to the same time slice and the sampling point location, then the attribute information of the corresponding (T1, loc1(x1, y1)) includes programmer and playing soccer, and the confidence is 1/1=1. The following implication (T1, loc1(x1, y1))-->{(programmer, 1), (playing soccer, 1)}.

Further with (T2, loc1(x1, y1)) as an example, there is a correspondence relation (T2, loc1(x1, y1))-->{(programmer, 1), (singing, 1)} of mobile user 1 and the correspondence relation (T2, loc1(x1, y1))-->{(programmer, 1), (singing, 1)} of the mobile user 2 with respect to the time slice and the sampling point location, then the attribute information corresponding to (T2, loc1(x1, y1)) includes programmer, playing soccer, and singing. Herein, the "programmer" occurs in all correspondence relations of mobile user 1 and mobile user 2, then its confidence is 1; "playing soccer" only occurs in the correspondence relation of mobile user 1, and the corresponding times of occurrence is 2, but it does not occur in the correspondence relation of mobile user 2, which has times of occurrence 2, then the confidence of "playing soccer" is 2/(2+2)=0.5; likewise, the confidence of "singing" is also 0.5. Finally, the implication (T2, loc1(x1, y1))-->{(programmer, 1), (playing soccer, 0.5), (singing, 0.5)} may be obtained. Likewise, all implications may be obtained:
(T1, loc1(x1, y1))-->{(programmer, 1), (playing soccer, 1)};
(T2, loc1(x1, y1))-->{(programmer, 1), (playing soccer, 0.5), (singing, 0.5)};
(T1, loc3(x3, y3))-->{(programmer, 1), (playing soccer, 1)};
(T2, loc2(x2, y2))-->{(programmer, 2), (singing, 2)}

In operation S302, at least one geographical area is obtained by clustering a plurality of sampling point locations based on a similarity between a plurality of sampling point locations with respect to the same time slice, wherein the similarity between sampling point locations is determined based on a spatial similarity between sampling point locations and a similarity between attribute information included in the set of a plurality of pieces of information. According to the embodiments of the present invention, the similarity between sampling point locations may be obtained based on Euclidean metric. Euclidean metric is a commonly adopted distance definition, which refers to an actual distance between two points in an m-dimensional space, or a natural length of a vector (i.e., the distance between the point and the original point). The Euclidean distance in two-dimensional or three-dimensional space is just the actual distance between two points. A spatial similarity equation between any two sampling point locations is provided below:

$D=\sqrt{(x_1-x_2)^2+(y_1-y_2)^2}$, wherein $(x_1, y_1)$ is a coordinate of the sampling point location A, and $(x_2, y_2)$ is a coordinate of the sampling point location B.

According to the embodiments of the present invention, a similarity between attribute information in a set of a plurality of pieces of attribute information may be measured based on a cosine similarity. Specifically, the similarity between attribute information is measured through measuring the cosine value for the angle of a vector inner product space of confidences of two pieces of attribute information. The equation for calculating the similarity between two pieces of attribute information is specified below:

$$S = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

wherein A and B are vectors of confidences of two pieces of attribute information, respectively.

The equation for calculating the similarity P of the sampling point location is calculated as:

$P=\alpha D+\beta S$ wherein α denotes a coefficient of a spatial similarity D between sampling point locations, β denotes a coefficient of a similarity S between attribute information.

At least one geographical area is obtained by clustering a sampling point locations having a higher similarity, wherein the at least one geographical area covers a coordinate range for sampling point locations with higher similarity. For example, a similarity threshold may be set. The sampling point location whose similarity has exceeded the similarity threshold may be regarded as a sampling point location having a higher similarity.

In operation S303, a set of attribute information of the geographical area with respect to the time slice is determined.

According to one embodiment of the present invention, for the same time slice, attribute information in a set of attribute information corresponding to the sampling point locations included in the geographical area is merged, and redundant attribute information is removed, thereby obtaining a set of attribute information of the geographical area.

According to another embodiment of the present invention, a set of attribute information of the geographical area with respect to the time slice is determined based on importance of the attribute information. Specifically, global weights of all attribute information included in the set of a plurality of pieces of attribute information of at least one geographical area are calculated, wherein the global weights of the attribute information are obtained by calculating area weights for the attribute information included in the set of attribute information of respective geographical area, e.g., the area weights of attribute information included in a set of attribute information of each geographical area may be obtained by aggravating confidences of attribute information specific for a time slice based on a set of attribute information of respective geographical area; and area weights of attribute information of at least one geographical area corresponding to all time slices as recorded are aggregated to obtain the global weights of the attribute information. The area weights of attribute information included in a set of attribute information with respect to the time slice and the geographical area are adjusted using the global weights; a set of attribute information of the geographical area specific for the time slice is determined based on the values of the adjusted area weights of attribute information.

For example, in operation S302, for time slice T1, two sampling point locations loc1 and loc2 are clustered into geographical area area1, and for time slice T1, two sampling point locations loc3 and loc4 are clustered into geographical area area2, namely, (T1, loc1)->(attribute 1, confidence 1), (attribute 2, confidence 2).

(T1, loc2)->(attribute 1, confidence 1) (attribute 3, confidence 3).

Cluster: (T1, area1)->(attribute 1, score1)(attribute 2, score2) (attribute 3, score3).

(T1, loc3)->(attribute 1, confidence 1), (attribute 2, confidence 2).

(T1, loc4)->(attribute 2, confidence 2) (attribute 3, confidence 3).

Cluster: (T1, area2)->(attribute 1, score4) (attribute 2, score5) (attribute 3, score6)

(Score1, Score2, Score3) are area weights of attribute information of geographical area 1.

(Score4, Score5, Score6) are area weights of attribute information of geographical area area2. The area weights of attribute information of geographical area area1 may be obtained based on confidences of attribute information corresponding to two sampling point locations loc1 and loc2; the area weights of the attribute information of geographical area area2 may be obtained based on the confidences of attribute information corresponding to two sampling point locations loc3 and loc4, e.g., adding the confidences corresponding to the same attribute.

The area weight vector of the attribute information of the geographical area area1 Varea1, (Score1, Score2, Score3);

The area weight vector of the attribute information of the geographical area area2 Varea2=(Score4, Score5, Score6);

Global weights (W1, W2, W3) of attribute information of geographical areas area 1 and area 2 are obtained based on the area weights of the attribute information of geographical areas area1 and area2, e.g., by adding area weights corresponding to the same attribute to obtain the global weight of the attribute.

The global weight vector of the attribute information of geographical areas area1 and area2 is: Vglobal=(W1, W2, W3), Area weight vector of attribute information of geographical areas area1 and area2 is adjusted using a global weight vector Vglobal of attribute information, i.e., obtaining an adjusted area weight of attribute information by the global weight of the attribute information minus the area weight. Vglobal-Varea1, (Score1', Score2', Score3');

Vglobal−Varea2=(Score4', Score5', Score6');
(T1, area1)->(attribute 1, Score1'), (attribute 2, Score2'), (attribute 3, Score3'),
(T1, area2)->(attribute 1, Score4'), (attribute 2, Score5'), (attribute 3, Score6'),
wherein Score1', Score2', Score3', Score4', Score5' and Score6' are obtained by calculation based on Score1, Score2, Score3, Score4, Score5, Score6 and W1, W2 and W3.

A set of attribute information of the geographical area with respect to the time slice is determined based on the values of adjusted area weights of the attribute information, e.g., maintaining the attribute information with a relatively large area weight. The value of the adjusted area weights of attribute information eliminates the impact of global distribution of different attribute information on the value of area weight of attribute information and reflects more accurately the importance of the attribute information with respect to the time slice in the geographical area.

According to another embodiment of the present invention, determining attribute information with respect to the geographical area and the time slice further includes: obtaining a tree hierarchical structure of attribute information; replacing the attribute information in the set of attribute information with higher-level attribute information based on the tree hierarchical structure of the attribute information. The attribute information after replacement tag the features of the geographical area more explicitly; besides, the features of the geographical area expressed by different attribute information in the set of attribute information after replacement have a higher differentiation and uniqueness.

According to an embodiment of present invention, there further comprises: performing information recommendation for a mobile object related to attribute information included in the set of attribute information with respect to the time slice based on the obtained set of attribute information of at least one geographical area with respect to the time slice, thereby achieving a targeted information recommendation.

Figure 5:
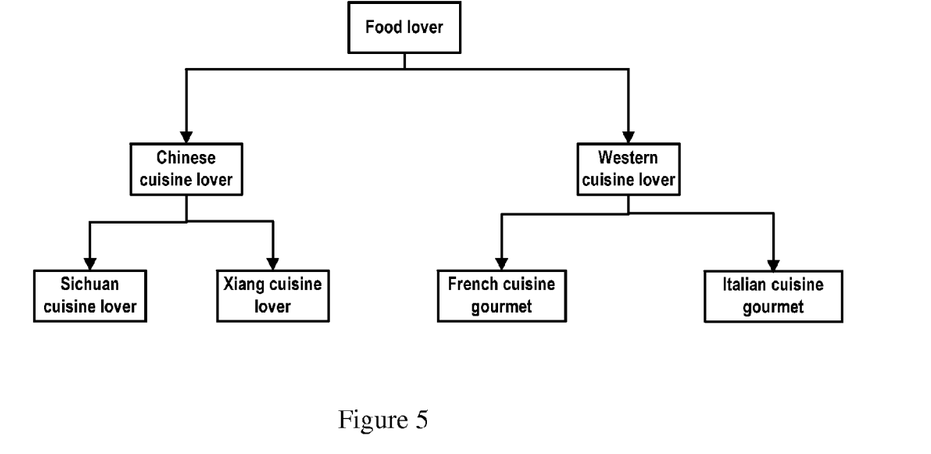
FIG. 5 shows an example of a tree-like hierarchical structure of attribute information according to an embodiment of the present invention.

FIG. 4 shows a flowchart of replacing attribute information in a set of attribute information into higher-level attribute information according to embodiments of the present invention. In operation S401, a tree hierarchical structure of attribute information is obtained, which tree hierarchical structure is partitioned into different levels based on the generalization of attribute information. Excluding the root node in the highest level, each of other levels is composed of a plurality of subnodes. Each subnode corresponds to one attribute, and its parent node is a higher-level attribute relative to the attribute of the subnode. FIG. 5 shows an exemplary tree hierarchical structure of attribute information according to the embodiments of the present invention. The tree hierarchical structure is composed of three levels, with the lowest level comprising subnodes of four attributes: Sichuan cuisine lover, Xiang cuisine lover, French cuisine gourmet, and Italian cuisine lover, wherein the parent node for the Sichuan cuisine lover and Xiang cuisine lover corresponds to the higher-level Chinese cuisine lover, the parent node for the French cuisine lover and Italian cuisine lover correspond to the higher-level Western food lover; the parent node for the higher-level Chinese food lover and French food lover correspond to the highest-level root node food lover; in operation S402, an information entropy threshold $\Delta$ is designated; in operation S403, a target level is set to the lowest level in the tree hierarchical structure; in operation S404, information entropies I of area weights of all attributes in nodes having a common parent node; in operation S405, it is judged whether I is smaller than the information entropy threshold $\Delta$; if no, in operation S406, the attribute in the target level is deleted from the set of attribute information of the geographical area; in operation S407, the attribute of the parent node is added into the set of attribute information of the geographical area and the area weight of this attribute is calculated; in operation S408, the target level is set to a higher level for the current target level, and back to operation S408; if yes, the flow ends.

According to one embodiment, there further comprises performing information recommendation for a mobile object related to attribute information included in the set of attribute information with respect to the time slice based on the obtained set of attribute information of at least one geographical area with respect to the time slice, so as to perform information recommendation pertinently to the relevant mobile object based on attribute information within different time slices.

According to one embodiment of the present invention, there further comprises: partitioning the at least one geographical area into a plurality of sub-geographical areas based on an association between the attribute information included in the set of attribute information of the at least one geographical area with respect to the time slice and regions within the at least one geographical area, and displaying, in the sub-geographical areas, attribute information having a greater association therewith.

Figure 6:
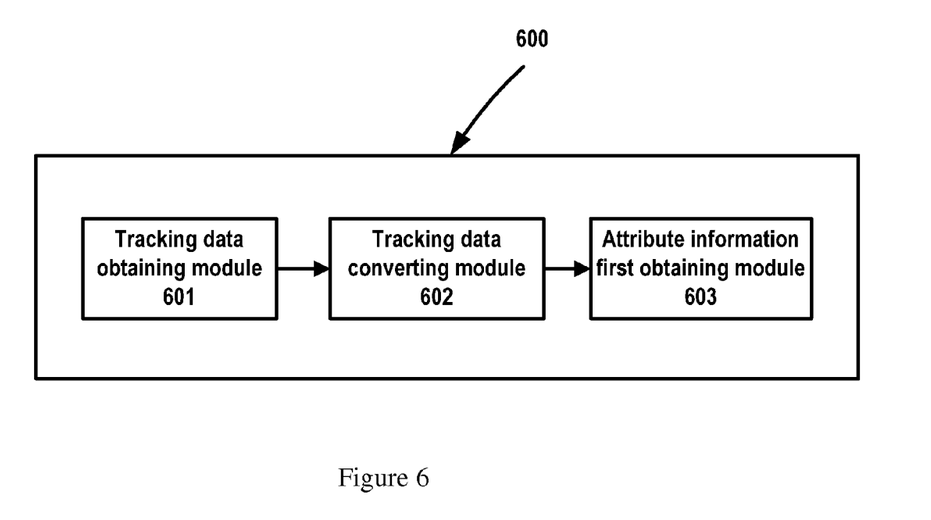
FIG. 6 shows an apparatus for tagging a geographical area according to an embodiment of the present invention.

Based on the same invention concept, the present invention further provides an apparatus for tagging a geographical area. FIG. 6 shows an apparatus 600 for tagging a geographical area according to the embodiments of the present invention, comprising: a tracking data obtaining module 601 configured to obtain attribute information and mobile tracking data of a plurality of mobile objects, wherein the mobile tracking data comprises sampling time and corresponding sampling point locations of the mobile objects; a tracking data converting module 602 configured to convert the mobile tracking data of the plurality of mobile objects into new mobile tracking data according to the correspondence relationship between the sampling time and time slices, wherein the new mobile tracking data include time slices and corresponding sampling point locations; and attribute information first obtaining module 603 configured to obtain a set of attribute information of at least one geographical area with respect to the time slices based on the new mobile tracking data, wherein the at least one geographical area is obtained by clustering the sampling point locations.

According to the embodiments of the present invention, the attribute information first obtaining module 603 comprises: an attribute information second obtaining module configured to obtain a set of attribute information of a plurality of mobile objects with respect to the same time slice and the same sampling point location based on new mobile tracking data; a clustering module configured to cluster sampling point locations based on similarity between the sampling point locations with respect to the same time slice, thereby obtaining at least one geographical area; an attribute information first determining module configured to determine a set of attribute information of at least one geographical area with respect to the time slice.

According to the embodiments of the present invention, the similarity between sampling point locations is determined based on spatial similarity between sampling point locations and similarity between attribute information included in a plurality of sets of attribute information; and the at least one geographical area covers sampling point locations with a higher similarity.

According to the embodiments of the present invention, the attribute information first determining module is further configured to: merge attribute information in a set of attribute information corresponding to sampling point locations within the at least one geographical area with respect to the time slice and remove redundant attribute information, thereby obtaining a set of attribute information of the at least one geographical area.

According to the embodiments of the present invention, the attribute information first determining module further comprises: a global weight calculation module configured to calculate global weights of all attribute information included in a plurality of sets of attribute information of the at least one geographical area with respect to the time slice, wherein the global weights of the attribute information is obtained by calculating area weights of attribute information in a set of attribute information of respective geographical areas with respect to the time slice; an area weight adjusting module configured to adjust area weights for attribute information in a plurality of sets of attribute information of the at least one geographical area with respect to the time slice by using the global weights; and attribute information second determining module configured to determine a set of attribute information of the at least one geographical area with respect to the time slice based on the adjusted values of area weights of attribute information.

According to the embodiments of the present invention, wherein the attribute information first determining module further comprises: a hierarchical structure obtaining module configured to obtain a tree hierarchical structure of attribute information; an attribute information replacement module configured to replace the attribute information in a set of attribute information of the at least one geographical area with higher-level attribute information based on the tree hierarchical structure of attribute information.

According to the embodiments of the present invention, there further comprises a recommendation module configured to perform information recommendation for a mobile object related to attribute information included in the set of attribute information of the at least one geographical area with respect to the time slice based on the obtained set of attribute information of at least one geographical area with respect to the time slice.

According to the embodiments of the present invention, there further comprises a displaying module configured to partition the at least one geographical area into a plurality of sub-geographical areas based on an association between the attribute information included in the set of attribute information of the at least one geographical area with respect to the time slice and regions within the at least one geographical area, and display, in the sub-geographical areas, attribute information having a greater association therewith.

For specific implementation methods of above respective implementation manners, refer to the detailed description of the method of tagging a geographical area according to the embodiments of the present invention, which will not be detailed here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of tagging a geographical area, the method comprising:
   obtaining, with a processing device, attribute information and mobile tracking data of a plurality of mobile objects, wherein the mobile tracking data comprises sampling time and corresponding sampling point locations of the mobile objects;
   converting the mobile tracking data of the plurality of mobile objects into new mobile tracking data according to the correspondence relationship between the sampling time and a time slices, the attribute information, and occurrence times, wherein the new mobile tracking data include time slices and corresponding sampling point locations, wherein the occurrence times are based on the number of times each of the plurality of mobile object is recorded at the time slices and sampling point locations of the new mobile tracking data; and
   obtaining a set of attribute information of at least one geographical area with respect to the time slices based on the new mobile tracking data by:
      obtaining a set of attribute information of a plurality of mobile objects with respect to a same time slice and a same sampling point location based on the new mobile tracking data;
      clustering sampling point locations based on a similarity between sampling point locations with respect to the same time slice to obtain at least one geographical area; and
      determining a set of attribute information of the at least one geographical area with respect to the time slice, wherein the at least one geographical area is obtained by clustering the sampling point locations.

2. The method of claim 1, wherein the similarity between the sampling point locations is determined based on a spatial similarity between the sampling point locations and a similarity between attribute information included in a plurality of sets of attribute information.

3. The method of claim 1, wherein the at least one geographical area covers sampling point locations having a higher similarity.

4. The method of claim 1, wherein determining the set of attribute information of the at least one geographical area with respect to the time slice further comprises merging attribute information in a set of attribute information corresponding to sampling point locations within the at least one geographical area with respect to the time slice and remove redundant attribute information, thereby obtaining a set of attribute information of the at least one geographical area.

5. The method of claim 4, wherein determining the set of attribute information of the at least one geographical area with respect to the time slice further comprises:
   calculating global weights of all attribute information included in a plurality of sets of attribute information of the at least one geographical area with respect to the time slice, wherein the global weights of the attribute information is obtained by calculating area weights of attribute information in a set of attribute information of respective geographical areas with respect to the time slice;
   adjusting area weights for attribute information in a plurality of sets of attribute information of the at least one geographical area with respect to the time slice by using the global weights; and
   determining the set of attribute information of the at least one geographical area with respect to the time slice based on the adjusted values of area weights of attribute information.

6. The method of claim 1, wherein determining attribute information with respect to geographical area and the time slice further comprises obtaining a tree hierarchical structure of the attribute information, and replacing the attribute information in the set of attribute information of the at least one geographical area with higher-level attribute information based on the tree hierarchical structure of the attribute information.

7. The method of claim 1, further comprising performing information recommendation for a mobile object related to attribute information included in the set of attribute information of the at least one geographical area with respect to the time slice based on the obtained set of attribute information of at least one geographical area with respect to the time slice.

8. The method according to claim 1, further comprising partitioning the at least one geographical area into a plurality of sub-geographical areas based on an association between the attribute information included in the set of attribute information of the at least one geographical area with respect to the time slice and regions within the at least one geographical area, and displaying, in the sub-geographical areas, attribute information having a greater association therewith.

* * * * *